US007771688B2

United States Patent
Lee et al.

(10) Patent No.: US 7,771,688 B2
(45) Date of Patent: Aug. 10, 2010

(54) METHOD FOR PREPARING TITANIUM DIOXIDE PARTICLES CO-DOPED WITH NITROGEN AND FLUORINE

(75) Inventors: Ming-Kwei Lee, Kaohsiung (TW); Tsung-Hsiang Shih, I-Lan Hsien (TW)

(73) Assignee: National Sun Yat-Sen University, Kaohsiung (TW)

( * ) Notice: Subject to any disclaimer, the term of this patent is extended or adjusted under 35 U.S.C. 154(b) by 132 days.

(21) Appl. No.: 11/858,101

(22) Filed: Sep. 19, 2007

(65) Prior Publication Data

US 2009/0074651 A1   Mar. 19, 2009

(51) Int. Cl.
    C01B 21/00   (2006.01)
(52) U.S. Cl. ........................................ 423/386; 423/610
(58) Field of Classification Search ................. 423/351, 423/386, 462, 608, 610
    See application file for complete search history.

(56) References Cited

U.S. PATENT DOCUMENTS

2007/0099003 A1* 5/2007 Lee et al. .................... 428/446

OTHER PUBLICATIONS

Yu et al., The Effect of Calcination Temperature on the Surface Microstructrures and Photocatalytic Activity of TiO Thin Films Prepared by Liquid Phase Deposition, 2003, The Journal of Physical Chemistry B, 107 (50), 13871-13879.*
Deki et al., Titanium (IV) Oxide Thin Films Prepared from Aqueous Solution, 1996, Chemistry Letters, 433-434.*
Asahi, R., et al., "Visible-Light Photocatalysis in Nitrogen-Doped Titanium Oxides"; Science, 2001, vol. 293, pp. 269-271.
Li, D., et al., "Visible-Light-Driven N-F-Codoped $TiO_2$ Photocatalysts. 1. Synthesis by Spray Pyrolysis and Surface Characterization"; Chem. Mater., 2005, vol. 17, pp. 2588-2595.
Li, D., et al., "Visible-Light-Driven N-F-Codoped TiO2 Photocatalysts. 2. Optical Characterization, Photocatalysis, and Potential Application to Air Purification"; Chem. Mater., 2005, vol. 17, pp. 2596-2602.
Moriguchi, I., et al., "Oriented growth of thin films of titanium oxyfluoride at the interface of an air/water monolayer"; Chem. Commun., 2001, pp. 1344-1345.
Yu, J., et al., "The Effect of Calcination Temperature on the Surace Microstructure and Photocatalytic Activity of $TiO_2$ Thin Films Prepared by Liquid Phase Deposition"; J. Phys. Chem. B, 2003, vol. 107, pp. 13871-13879.

* cited by examiner

Primary Examiner—Timothy C Vanoy
Assistant Examiner—Richard M Rump
(74) Attorney, Agent, or Firm—Christie Parker & Hale, LLP

(57) ABSTRACT

A method for preparing titanium dioxide particles co-doped with nitrogen and fluorine includes the steps of: mixing boric acid with ammonium fluorotitanate in an aqueous medium to form ammonium oxotrifluorotitanate; liquid-phase depositing the ammonium oxotrifluorotitanate on a silicon-containing substrate; and thermo-treating the ammonium oxotrifluorotitanate on the silicon-containing substrate at a temperature ranging from 300 to 1000° C.

12 Claims, 9 Drawing Sheets

METHOD FOR PREPARING TITANIUM DIOXIDE PARTICLES CO-DOPED WITH NITROGEN AND FLUORINE

BACKGROUND OF THE INVENTION

1. Field of the Invention

The invention relates to a method for preparing titanium dioxide particles, more particularly to a method for preparing titanium dioxide particles co-doped with nitrogen and fluorine.

2. Description of the Related Art

A photocatalyst is a catalyst which is capable of being excited by light energy to conduct a catalytic reaction. When the photocatalyst is irradiated by light, electrons in a valence band are excited to rise up to a conduction band, and corresponding holes are produced in the valence band, thereby forming electron/hole pairs. When the electrons and the holes react with water and oxygen, reactive free radicals, such as O, $O^-$, $O^{2-}$, $O^{3-}$, $OH^-$, etc., will be produced. Once the free radicals come into contact with organics, such as cell membranes of bacteria, the organics may be oxidized to produce water and carbon dioxide. Therefore, the cell membranes of the bacteria are destroyed, and a sterilization effect is achieved.

The compounds suitable for use as the photocatalyst include oxides, such as titanium dioxide, zinc oxide, niobium oxide, tungsten oxide, tin oxide, zirconium oxide, or the like, and sulfides, such as cadmium sulfide, zinc sulfide, or the like. Among them, titanium dioxide is a most popular photocatalyst used in the prevention of air pollution in view of its suitable energy gap, strong oxidation-reduction capability, high decomposition efficiency, non-toxic property, etc.

Generally, titanium dioxide has three types of crystal structures, i.e., anatase, rutile, and brookite. Among them, the anatase-type $TiO_2$ is a primary material useful as the photocatalyst in view of its suitable energy gap of 3.2 eV and its superior optical activity.

However, the excitation of anatase to conduct a photocatalytic reaction requires an energy of more than 3.2 eV, which corresponds to a light having a wavelength smaller than 387 nm, i.e., an ultraviolet ray. Therefore, the application of anatase as the photocatalyst is limited.

It is desirable in the art to reduce the energy band of titanium dioxide to a level suitable for exciting titanium dioxide using visible light having a wavelength ranging, for example, from 400 nm to 700 nm (The corresponding energy gap ranges from 3.1 eV to 1.7 eV). It is known according to Di Li et al., "*Fluorine-Doped $TiO_2$ Powders Prepared by Spray Pyrolysis and Their Improved Photocatalytic Activiy for Decomposition of Gas-Phase Acetaldehyde,*" Journal of Fluorine Chemistry, 2005, Vol. 126, pp. 69-77, that a visible light-driven photocatalysis can be obtained by doping titanium dioxide with fluorine to enhance surface acidity, to create oxygen vacancies, and to increase active sites.

It is known according to R. Asahi et al., "*Visible-Light Photocatalysis in Nitrogen-Doped Titanium dioxides,*" Science, Vol. 293, pp. 269-271, 13 Jul. 2001, that the substitutional doping of nitrogen (N) is the most effective among the substitutional doping of carbon (C), nitrogen (N), fluorine (F), phosphorous (P), or sulfur (S) for oxygen (O) in the anatase-type $TiO_2$ crystal because N (p) states contribute to the band-gap narrowing by mixing with O (2p) states. Visible-light activity could be introduced in $TiO_2$ by doping with N. The optical absorption spectra of $TiO_2$ can be shifted to the range of visible light, and the required band gap can be lowered to 2.9 eV.

It is known according to Di Li et al., "*Visible-Light-Driven N—F-Codoped $TiO_2$ Photocatalysts. 1. Synthesis by Spray Pyrolysis and Surface Characterization,*" Chem. Mater., 2005, 17, pp 2588-2595, and Di Li et al., "*Visible-Light-Driven N—F-Codoped $TiO_2$ Photocatalysts. 2. Optical Characterization, Photocatalysis, and Potential Application to Air Purification,*" Chem. Mater., 2005, 17, pp. 2596-2602,that N—F-codoped $TiO_2$ powders have a superior photocatalytic capability as compared to N-doped or F-doped $TiO_2$ powders. The N—F-codoped $TiO_2$ powders are synthesized by spray pyrolysis (SP) from a mixed aqueous solution containing $TiCl_4$ (0.03M) and $NH_4F$ (0.20 M) as $TiO_2$ and N/F precursors, respectively. A series of N—F-codoped $TiO_2$ powders are prepared by changing the SP temperature. N and F concentrations of N—F-codoped $TiO_2$ powders prepared at the SP temperature ranging from 500 to 1100° C. are shown in Table 1.

TABLE 1

| sample | SP temperature (° C.) | Total-N (at. %) | Total-F (at. %) |
|---|---|---|---|
| NFT-500 | 500 | 0.38 | 3.15 |
| NFT-600 | 600 | 1.19 | 2.80 |
| NFT-700 | 700 | 1.22 | 2.35 |
| NFT-800 | 800 | 0.83 | 1.90 |
| NFT-900 | 900 | 0.61 | 1.35 |
| NFT-1000 | 1000 | 0.52 | 1.01 |
| NFT-1100 | 1100 | 0.44 | 0.56 |

However, the N—F-codoped $TiO_2$ powders suffer from the problems such as limited solid solubility and uneven distribution of N and F elements in the $TiO_2$ powders due to the external doping of N and F elements with $TiO_2$. Therefore, the photocatalytic capability of the N—F-codoped $TiO_2$ powders is limited, and the oxidation-reduction effect is reduced. It is known according to Isamu Moriguchi et al., "*Oriented Growth of Thin Films of Titanium Oxyfluoride at the Interface of an Air/Water Monolayer,*" Chem. Commun., 2001, pp. 1344-1345, that, when an air/water monolayer of dioctadecyldimethylammonium bromide (DODMABr) is formed at 25° C. on the surface of a liquid-phase deposition (LPD) solution, which is a mixed aqueous solution of $(NH_4)_2TiF_6$ and $H_3BO_3$ at 1≦B/Ti<1.5, oriented crystallites of $NH_4TiOF_3$ are produced and grown at a hydrophilic interface of the monolayer to yield a self-supporting thin film. The $NH_4TiOF_3$ crystallites can be converted into anatase-type $TiO_2$ by air-calcination at 600° C.

However, as described above, the B/Ti molar ratio should be strictly limited to a relatively small range (i.e., 1≦B/Ti<1.5). Furthermore, a considerably large amount of $NH_4TiOF_3$ crystallites are deposited on the bottom of the reaction container, rather than at the monolayer. This means that the bonding strength between the $NH_4TiOF_3$ crystallites and the monolayer of DODMABr is considerably weak. Moreover, the monolayer of DODMABr may decompose during the air-calcination. Therefore, the aforesaid method is not suitable for industrial application.

SUMMARY OF THE INVENTION

Therefore, an object of the present invention is to provide a method for preparing titanium dioxide particles co-doped with nitrogen and fluorine, which can produce titanium dioxide particles containing higher nitrogen and fluorine concentrations and having uniform distributions of nitrogen and fluorine so as to improve photocatalytic capability of titanium dioxide.

The method for preparing titanium dioxide particles co-doped with nitrogen and fluorine according to this invention includes the steps of:

mixing boric acid with ammonium fluorotitanate in an aqueous medium to form ammonium oxotrifluorotitanate;

liquid-phase depositing the ammonium oxotrifluorotitanate on a silicon-containing substrate; and thermo-treating the ammonium oxotrifluorotitanate on the silicon-containing substrate at a temperature ranging from 300 to 1000° C.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
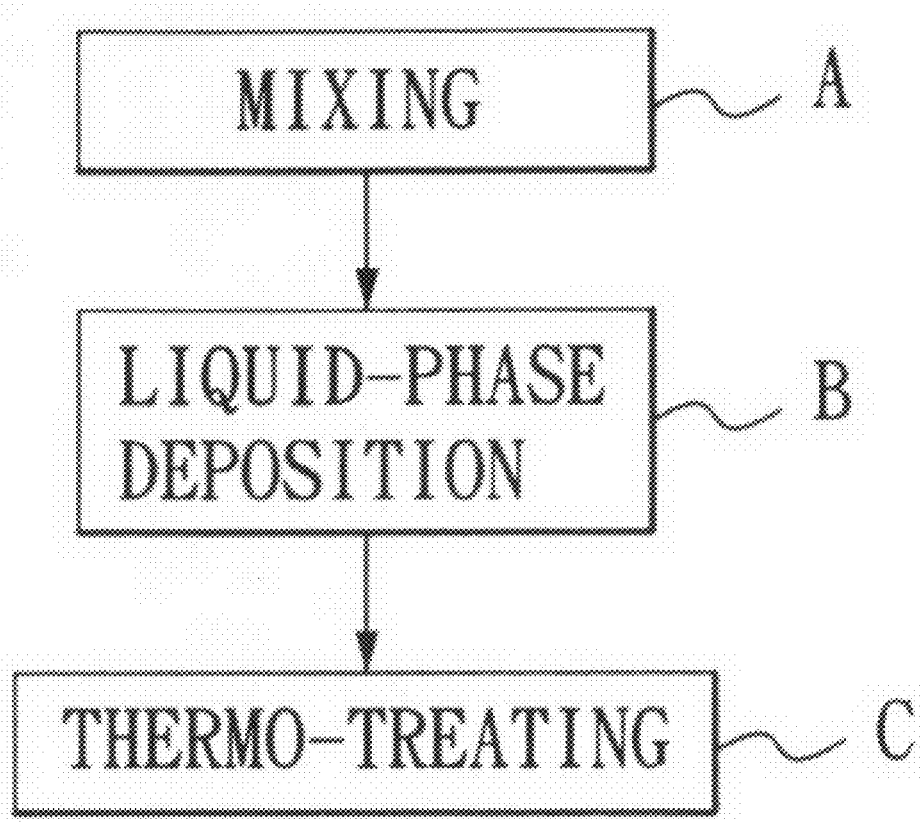
FIG. 1 is a flow diagram of the preferred embodiment of a method for preparing titanium dioxide particles co-doped with nitrogen and fluorine according to this invention.

Referring to FIG. 1, the preferred embodiment of a method for preparing titanium dioxide particles co-doped with nitrogen and fluorine (hereinafter referred to as N—F-codoped $TiO_2$ particles) according to this invention includes the steps of:

A) Mixing:

Boric acid ($H_3BO_3$) was mixed with ammonium fluorotitanate (($NH_4$)$_2TiF_6$) in a proper ratio in an aqueous medium to form ammonium oxotrifluorotitanate ($NH_4TiOF_3$). The molar ratio of the boric acid to the ammonium fluorotitanate ranges preferably from 0.2 to 1.5. Most preferably, the molar ratio is 0.6.

18.54 g of $H_3BO_3$ was dissolved in water to prepare an aqueous $H_3BO_3$ solution (0.3 M, 1000 ml). 98.9 g of ($NH_4$)$_2$TiF$_6$ was dissolved in water to prepare an aqueous ($NH_4$)$_2$TiF$_6$ solution (0.5M, 1000 ml). 10 ml of the aqueous $H_3BO_3$ solution and 10 ml of the aqueous ($NH_4$)$_2$TiF$_6$ solution were put to two corrosion-resisting beakers, respectively, and were preheated at 40° C. for 20 minutes. The preheated aqueous $H_3BO_3$ solution and the preheated aqueous ($NH_4$)$_2$TiF$_6$ solution were poured into one corrosion-resisting beaker (preheated at 40° C.), and were mixed sufficiently at 40° C. to obtain a mixed solution.

Figure 2:
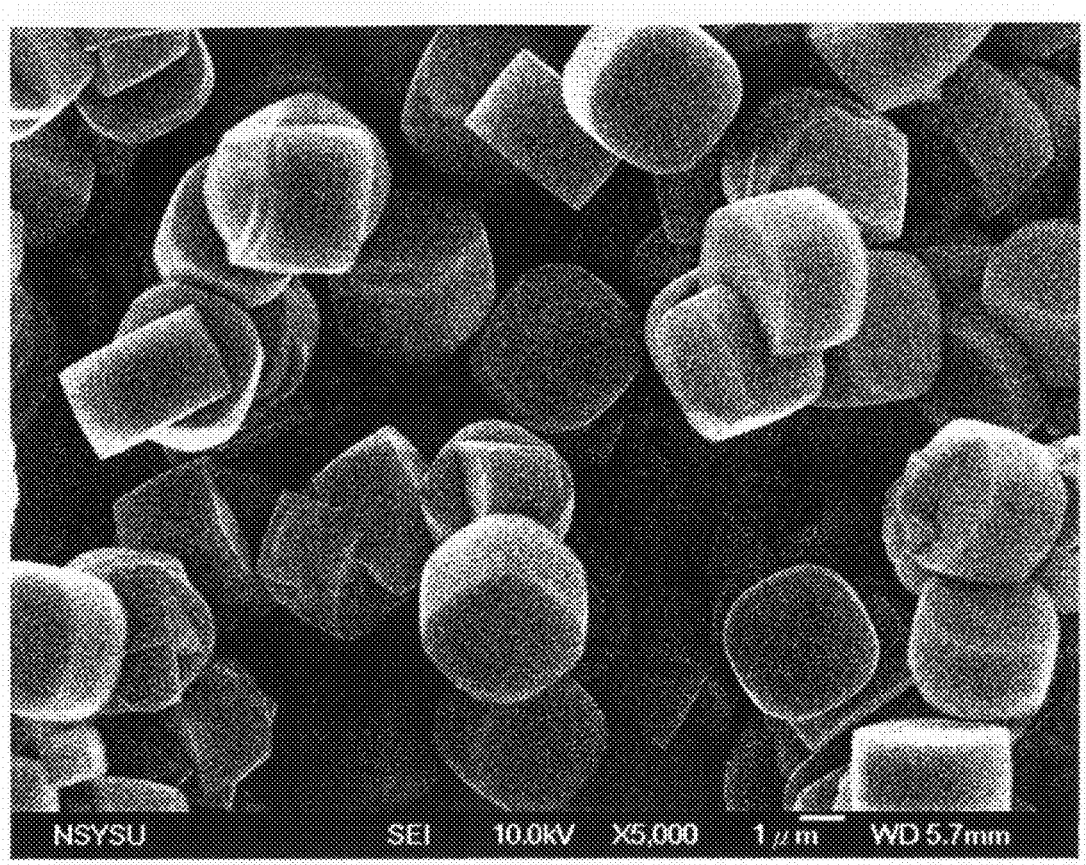
FIG. 2 is a microscopic image illustrating surface morphology of ammonium oxotrifluorotitanate ($NH_4TiOF_3$) crystallites deposited on a silicon-containing substrate.

B) Liquid-Phase Deposition:

A silicon-containing substrate made of glass was placed in the mixed solution. A layer of $NH_4TiOF_3$ crystallites was deposited on the substrate. The surface morphology of the $NH_4TiOF_3$ crystallites is shown in FIG. 2. The $NH_4TiOF_3$ crystallites have substantially cylindrical shapes and are formed in a stack on the silicon-containing substrate.

Aside from glass, other materials suitable for the silicon-containing substrate include polysilicon, silicon nitride, quartz, or the like, and combinations thereof.

The reaction for forming the $NH_4TiOF_3$ crystallites consists of three equilibrium reactions:

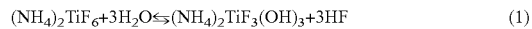

$$(NH_4)_2TiF_6 + 3H_2O \leftrightharpoons (NH_4)_2TiF_3(OH)_3 + 3HF \quad (1)$$

$$(NH_4)_2TiF_3(OH)_3 \leftrightharpoons NH_4TiOF_3 + NH_3 + 2H_2O \quad (2)$$

$$H_3BO_3 + 4HF \leftrightharpoons HBF_4 + H_2O \quad (3)$$

It is found from the aforesaid equilibrium reactions that, in addition to $NH_4TiOF_3$, hydrogen fluoride (HF) is produced during the reaction for forming the $NH_4TiOF_3$ crystallites.

HF produced in reaction (1) can react with the silicon-containing substrate to produce silicon tetrafluoride ($SiF_4$) according to the following reaction:

$$SiO_2 + 4HF \rightarrow SiF_4 + 2H_2O \quad (4)$$

According to Le Chatelier-braun's Law, the growth rate of $NH_4TiOF_3$ crystallites can be increased because HF formed in reaction (1) is consumed by the reaction with the silicon-containing substrate. Because the silicon-containing substrate can consume HF, the molar ratio of $H_3BO_3$ to ($NH_4$)$_2$TiF$_6$ can be broadened to a range of 0.2 to 1.5. As a result, it is not necessary to strictly control the molar ratio of the reactants within a very small range as narrow as that (1-1.5) used in the method of Isamu Moriguchi et al., and control of the procedure for the production of $NH_4TiOF_3$ may be facilitated. On the other hand, since the surface of the silicon-containing substrate eroded by HF can provide dangling bonds for bonding the $NH_4TiOF_3$ crystallites, the bonding strength between the $NH_4TiOF_3$ crystallites and the silicon-containing substrate is relatively strong. Therefore, the amount of the $NH_4TiOF_3$ crystallites deposited on the silicon-containing substrate can be increased.

C) Thermo-Treating:

After 2 hours of the liquid-phase deposition, the $NH_4TiOF_3$ crystallites deposited on the silicon-containing substrate were thermo-treated under a thermo-treating atmosphere at a temperature ranging from 300 to 1000° C. to obtain the N—F-codoped $TiO_2$ particles. The thermo-treating atmosphere used in the preferred embodiment was composed of oxygen so as to provide $TiO_2$ with oxygen vacancy. In addition to oxygen, other gases suitable for the thermo-treating atmosphere include ozone ($O_3$), nitrous oxide ($N_2O$), air, and the like. Notably, since the $NH_4TiOF_3$ crystallites contain essential elements (i.e., N, F, Ti, O) for the N—F-codoped $TiO_2$ particles, the thermo-treating atmosphere may be nitrogen or other inert gas atmospheres, or even a vacuum.

In the preferred embodiment, the thermo-treating step was conducted for a period ranging from 0.5 to 2 hours, preferably for 1 hour. It should be noted that the adhesion of the $NH_4TiOF_3$ crystallites onto the silicon-containing substrate will become poor when the thermo-treating step is conducted for a period of more than 2 hours.

The surface morphologies of the $NH_4TiOF_3$ crystallites thermo-treated at various temperatures are shown in FIGS. 2 to 6. The surface morphologies of the $NH_4TiOF_3$ crystallites were taken using a field-emission scanning electron microscope (FESEM).

Figure 7:
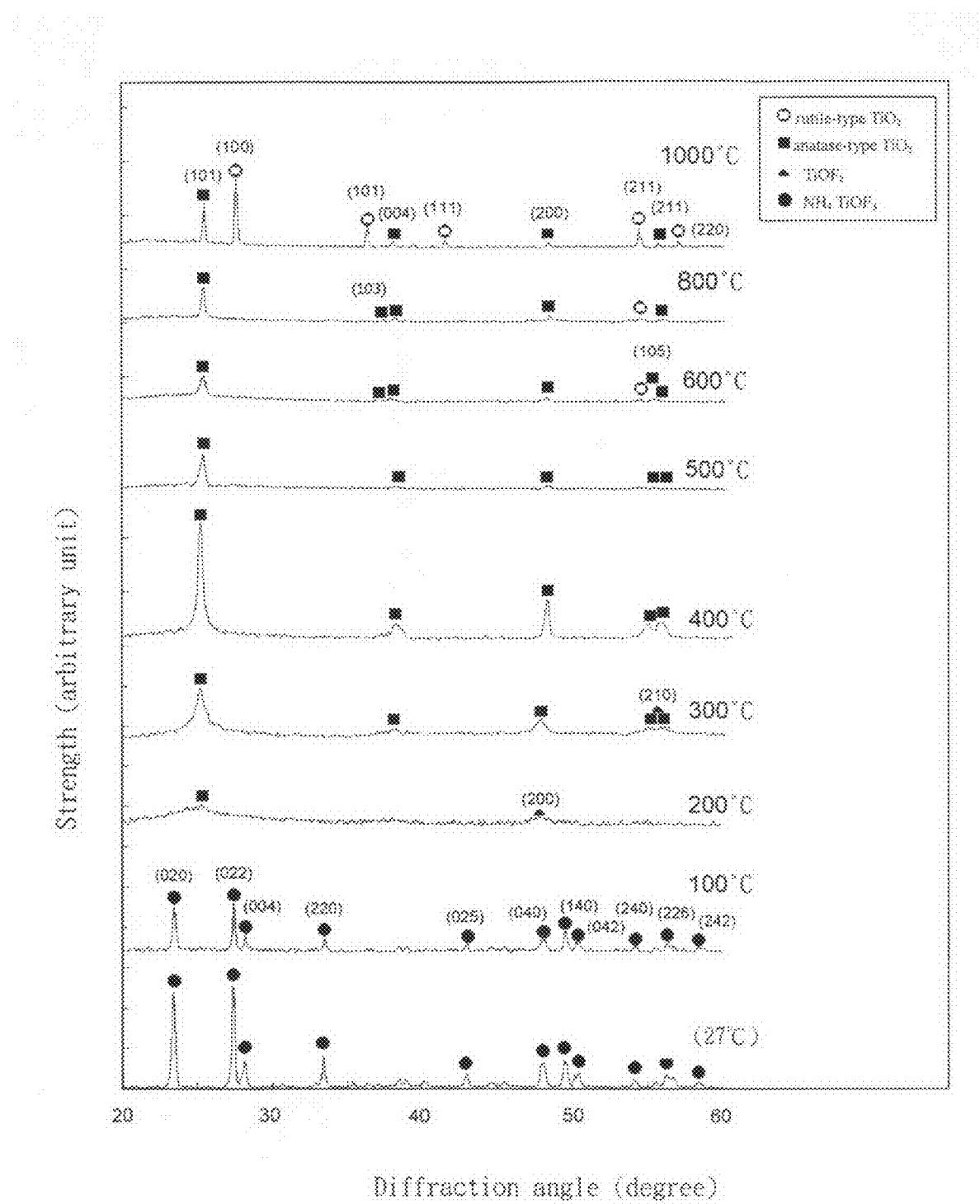
FIG. 7 is an X-ray diffraction (XRD) pattern illustrating the different compositions of $NH_4TiOF_3$ thermo-treated at various temperatures.

Referring to FIG. 7, the different compositions of the $NH_4TiOF_3$ crystallites thermo-treated at various thermo-treating temperatures were detected by X-ray diffraction (XRD), in which "●" represents $NH_4TiOF_3$, "▲" represents titanium oxyfluoride ($TiOF_2$), "■" represents anatase-type $TiO_2$, and "○" represents rutile-type $TiO_2$.

Figure 3:
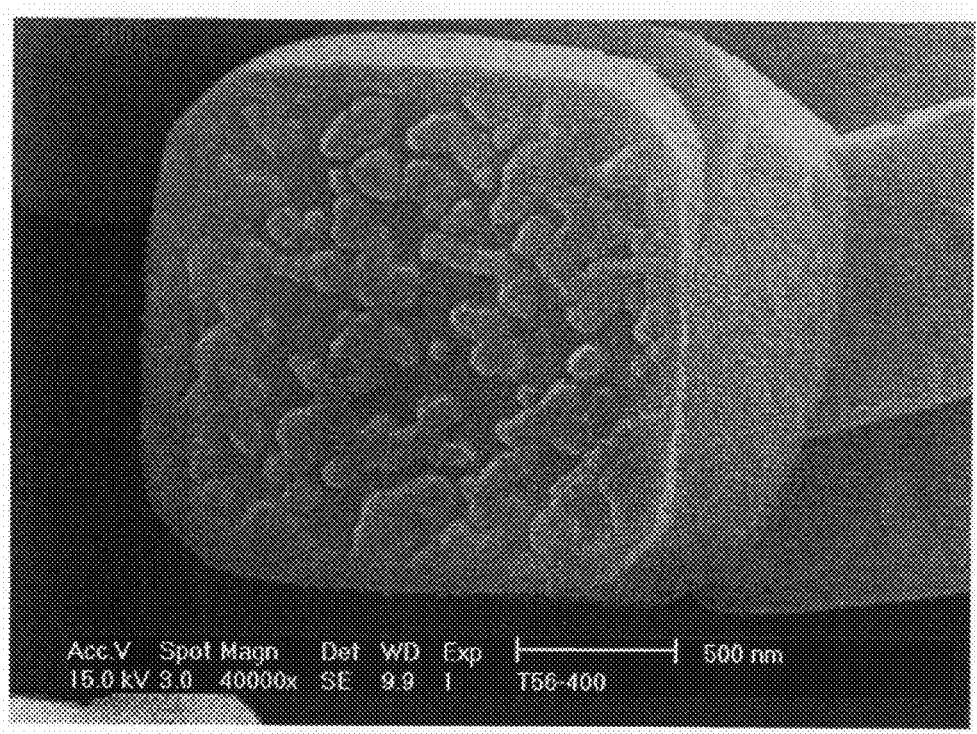
FIG. 3 is a microscopic image illustrating surface morphology of $NH_4TiOF_3$ crystallites thermo-treated at 400° C.
Figure 4:
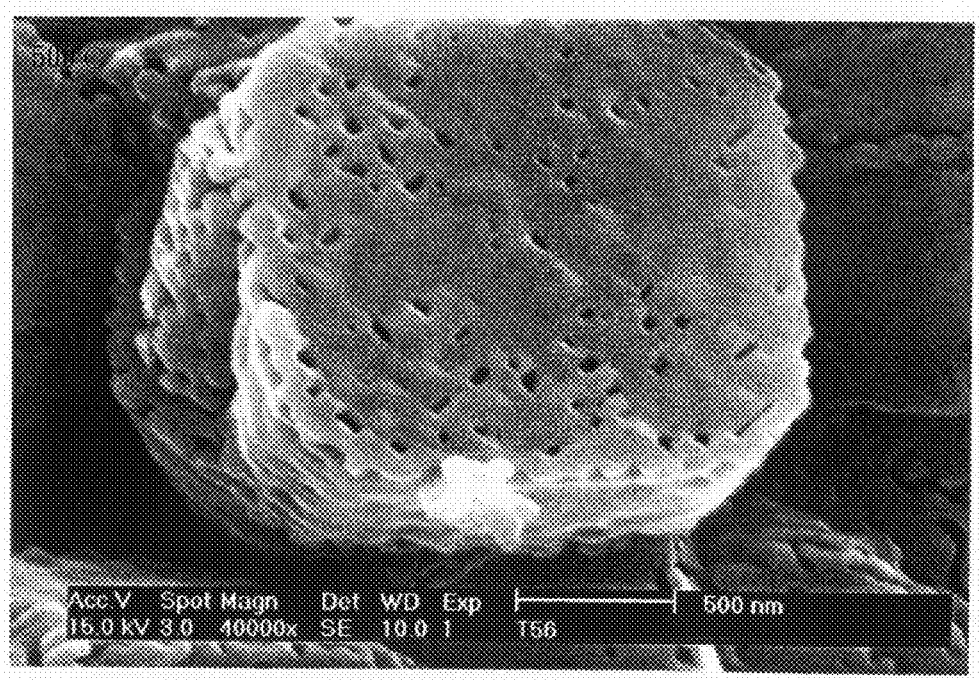
FIG. 4 is a microscopic image illustrating surface morphology of $NH_4TiOF_3$ crystallites thermo-treated at 500° C.
Figure 5:
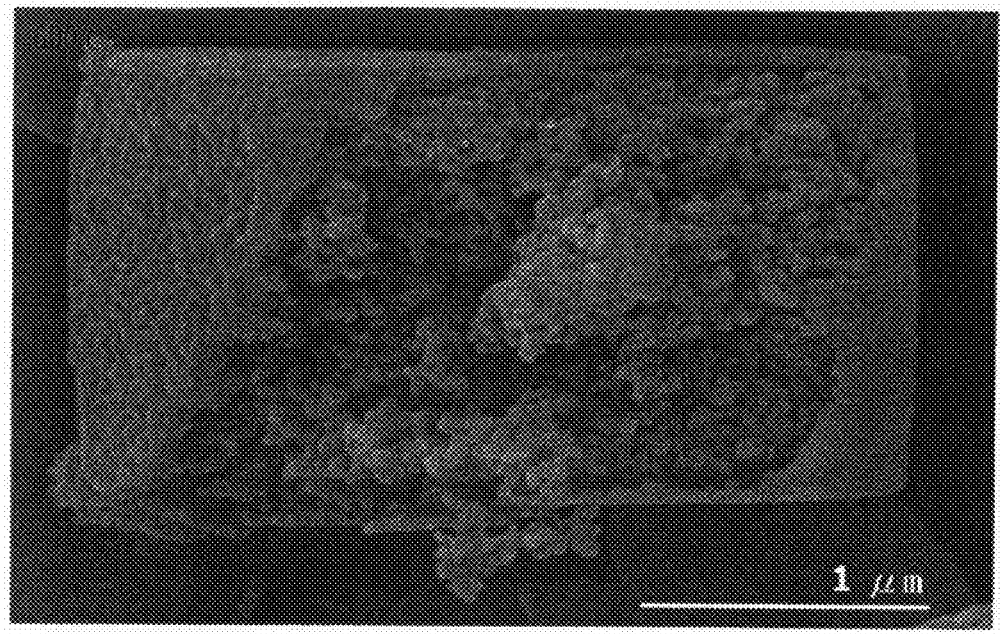
FIG. 5 is a microscopic image illustrating surface morphology of $NH_4TiOF_3$ crystallites thermo-treated at 600° C.
Figure 6:
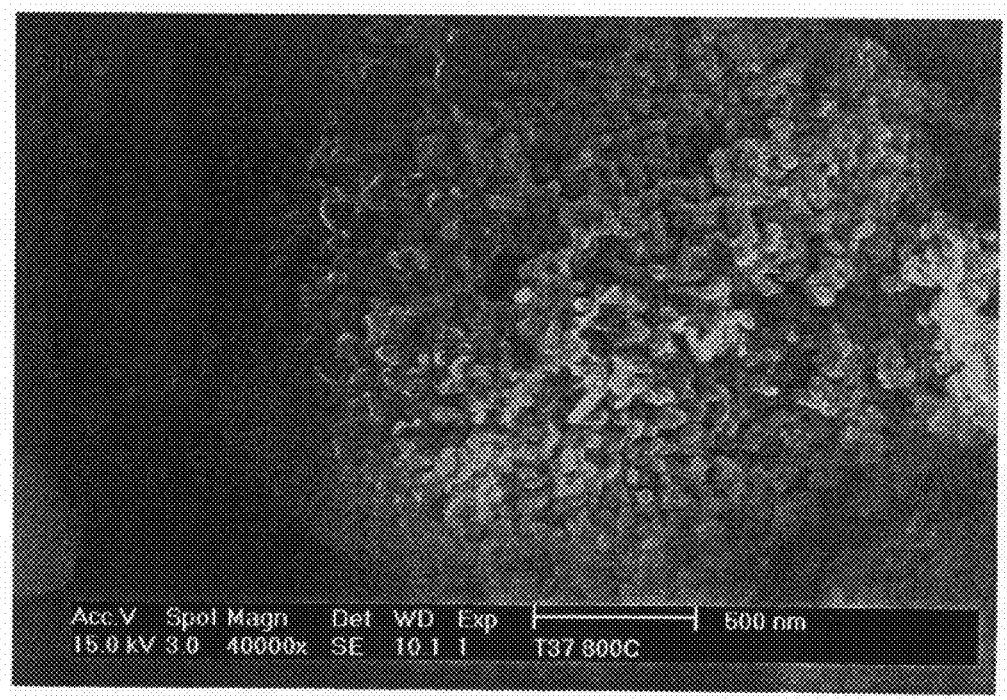
FIG. 6 is a microscopic image illustrating surface morphology of $NH_4TiOF_3$ crystallites thermo-treated at 800° C.

When the thermo-treating temperature is 100° C., $NH_4TiOF_3$ remains unchanged. When the thermo-treating temperature is 200° C., a major portion of $NH_4TiOF_3$ is converted to $TiOF_2$, and a portion of $NH_4TiOF_3$ is converted to $TiO_2$. When the thermo-treating temperature is 300° C., more of the material is converted to anatase-type $TiO_2$. When the thermo-treating temperature is 400° C., the surface of $TiO_2$ begins to decompose and merge, as best shown in FIG. 3. When the thermo-treating temperature is 500° C., the phenomenon of decomposition and merging continues, and voids are formed on the surface, as best shown in FIG. 4. When the thermo-treating temperature is 600° C., the shell is collapsed, and nano-scale N—F-codoped $TiO_2$ particles are seen, as best shown in FIG. 5. Additionally, a minor portion of anatase-type $TiO_2$ is converted to rutile-type $TiO_2$ because the thermo-treating temperature is higher than the conversion temperature of anatase (550° C.). When the thermo-treating temperature is 800° C., there is still a small amount of rutile because fluorine may hinder the phase-conversion from anatase to rutile. The shell is totally collapsed, as best shown in FIG. 6. When the thermo-treating temperature is 1000° C., a larger portion of anatase phase is converted to rutile phase.

In sum, $NH_4TiOF_3$ begins to convert to $TiOF_2$ at 200° C., and to anatase-type $TiO_2$ at 300° C. The shell begins to collapse at 600° C. to expose the nano-scale N—F-codoped $TiO_2$ particles at 600° C. Rutile-type $TiO_2$ is formed at 1000° C. The corresponding reactions are shown as follows:

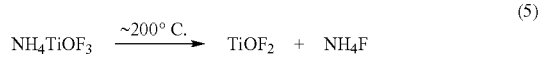

(5)

(6)

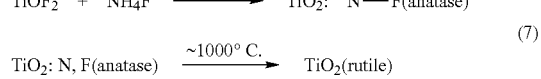

(7)

Figure 8:
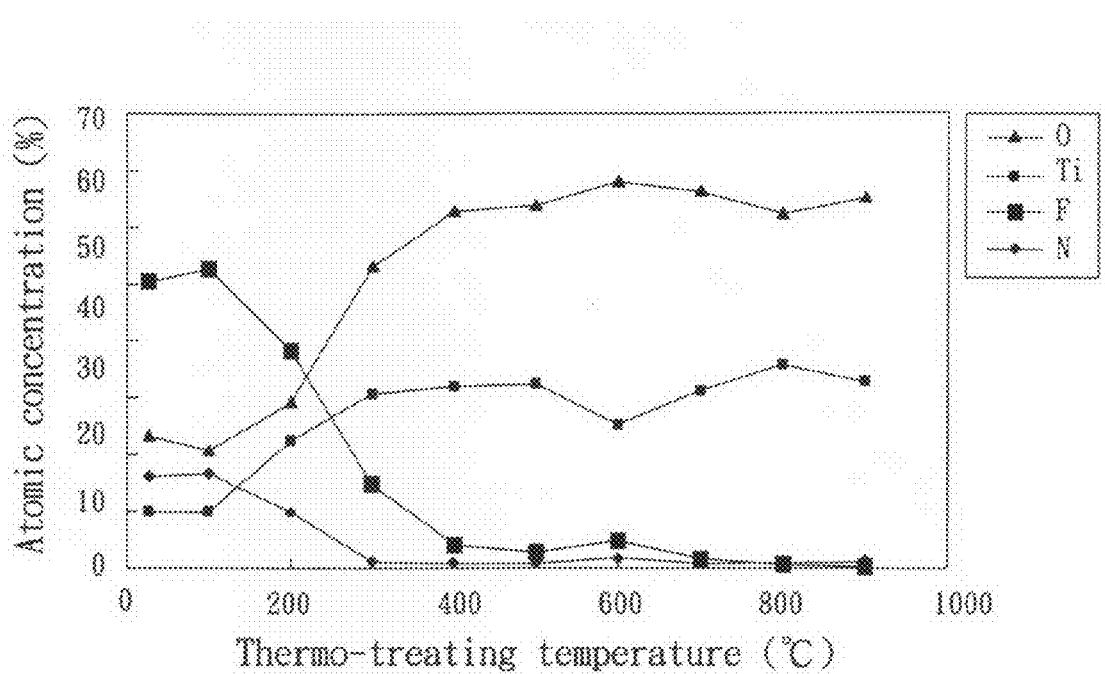
FIG. 8 is a plot illustrating the different concentrations of oxygen, fluorine, nitrogen, and titanium contained in the various crystallites formed by the preferred embodiment at various thermo-treating temperatures.
Figure 9:
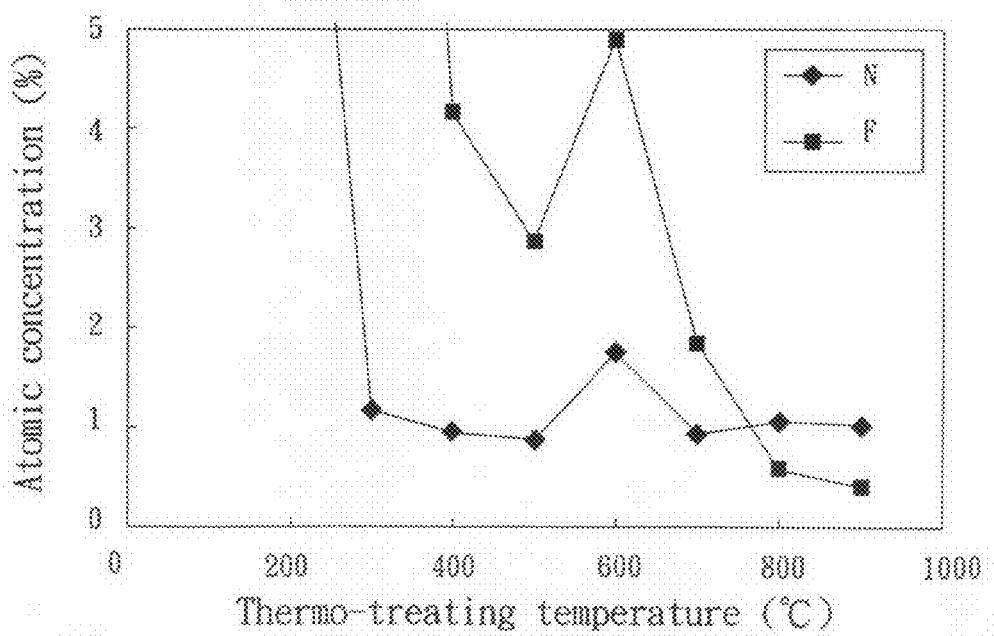
FIG. 9 is a plot illustrating the different concentrations of fluorine and nitrogen contained in the various crystallites formed by the preferred embodiment at various thermo-treating temperatures.

The different concentrations of the constituents contained in the various crystallites of the present invention and the prior arts formed at various thermo-treating temperatures were investigated using an electron spectroscopy for chemical analysis (ESCA). The results are shown in Table 2, and in FIGS. 8 and 9.

TABLE 2

| Thermo-treating temperature (° C.) | Example N (at. %) | Example F (at. %) | Comparative Example N (at. %) | Comparative Example F (at. %) |
|---|---|---|---|---|
| 27 | 16.23 | 50.54 | — | — |
| 100 | 16.66 | 52.68 | — | — |
| 200 | 9.96 | 38.23 | — | — |
| 300 | 1.17 | 14.67 | — | — |
| 400 | 0.95 | 4.17 | — | — |
| 500 | 0.87 | 2.87 | 0.38 | 3.15 |
| 600 | 1.76 | 4.88 | 1.19 | 2.80 |
| 700 | 0.94 | 1.84 | 1.22 | 2.35 |
| 800 | 1.07 | 0.59 | 0.83 | 1.90 |

As shown in Table 2, the concentration of nitrogen contained in the crystallites of the present invention is higher than that of the prior art at the thermo-treating temperature lower than 600° C. In view of the reference of R. Asahi et al., which describes that nitrogen is a most effective doping element in terms of photocatalytic effect, the higher the N concentration, the better will be the photocatalytic effect. Therefore, the N—F-codoped $TiO_2$ particles produced by the present invention have a superior photocatalytic effect as compared to the prior arts. When the thermo-treating temperature ranges from 600 to 800° C., the average concentration of nitrogen contained in the crystallites of the present invention is still higher than that of the prior arts, despite some concentration levels that are lower than that of the prior art. Therefore, the N—F-codoped $TiO_2$ particles produced by the present invention still have a superior photocatalytic effect.

Notably, as the shell is collapsed to produce the nano-scale N—F-codoped $TiO_2$ particles when the thermo-treating temperature is 600° C., the concentrations of F and N contained in the N—F-codoped $TiO_2$ particles are remarkably higher than those of the prior arts.

Furthermore, in the method of the present invention, the N—F-codoped $TiO_2$ particles are formed directly from the thermo-treating of $NH_4TiOF_3$, which already contains N and F therein. Therefore, N and F can be distributed evenly in the N—F-codoped $TiO_2$ particles so as to improve the photocatalytic effect.

Figure 10:
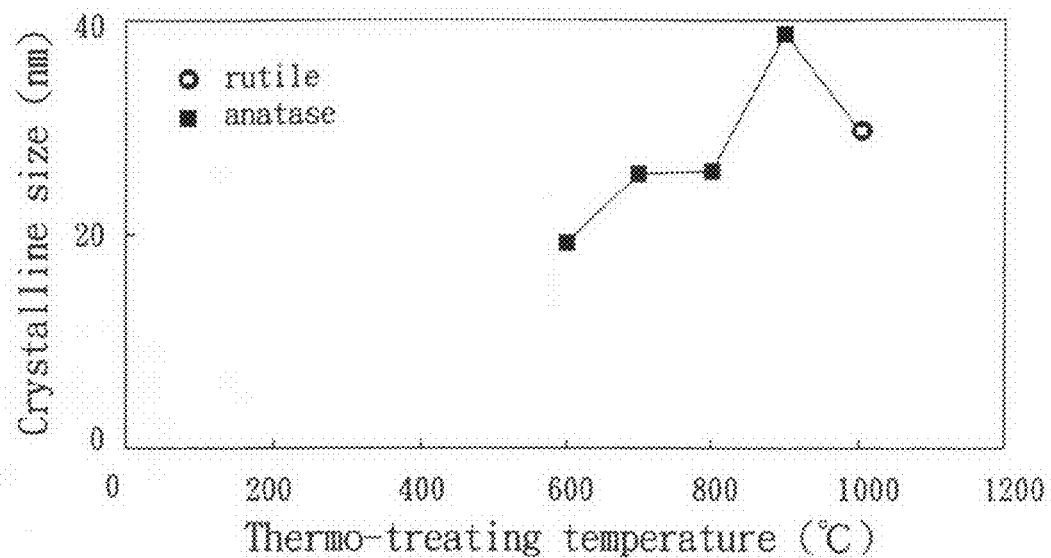
FIG. 10 is a plot illustrating the relationship between the crystallite size and the thermo-treating temperature.

Referring to FIG. 10, which illustrates the relationship between crystallite sizes and thermo-treating temperatures, the crystallite sizes in nanometer (nm) scale were calculated using the Scherrer equation. For the equation, reference can be made to "Scherrer, P. Gött. Nachr., 2, 98, 1918."

When the thermo-treating temperature is lower than 600° C., the crystallite size was estimated using a scale from the FESEM photograph. Referring to FIGS. 3 and 4, in which the thermo-treating temperatures are 400 and 500° C., respectively, it was found that the crystallite sizes of the $TiO_2$ crystallites were larger than 2 μm.

When the thermo-treating temperature is higher than 600° C., the $TiO_2$ crystallites of nanometer scale were formed because of shell collapse, and the crystallite size thereof can be calculated using the Scherrer equation. It is found in FIG. 10 that the crystallite size of the anatase-type N—F-codoped $TiO_2$ crystallites is increased as the thermo-treating temperature is raised due to the merging effect of the crystallites. However, the largest size was still smaller than 40 nm. The crystallite sizes at the thermo-treating temperatures of 600, 700, 800, 900, and 1000° C. were 19.1, 25.6, 25.8, 38.7, and 29.8 nm, respectively. The crystallite size at the thermo-treating temperature of 1000° C. is smaller than that at the thermo-treating temperature of 900° C. because the rutile-type F—N-codoped $TiO_2$ crystallites were formed at 1000° C., which has a relatively small lattice size and a relatively high atomic density. The crystallite sizes estimated from FIGS. 5 and 6 are substantially consistent to the aforesaid results, the results being that, when the temperature is higher than 600° C., $TiO_2$ nanoparticles are formed.

Figure 11:
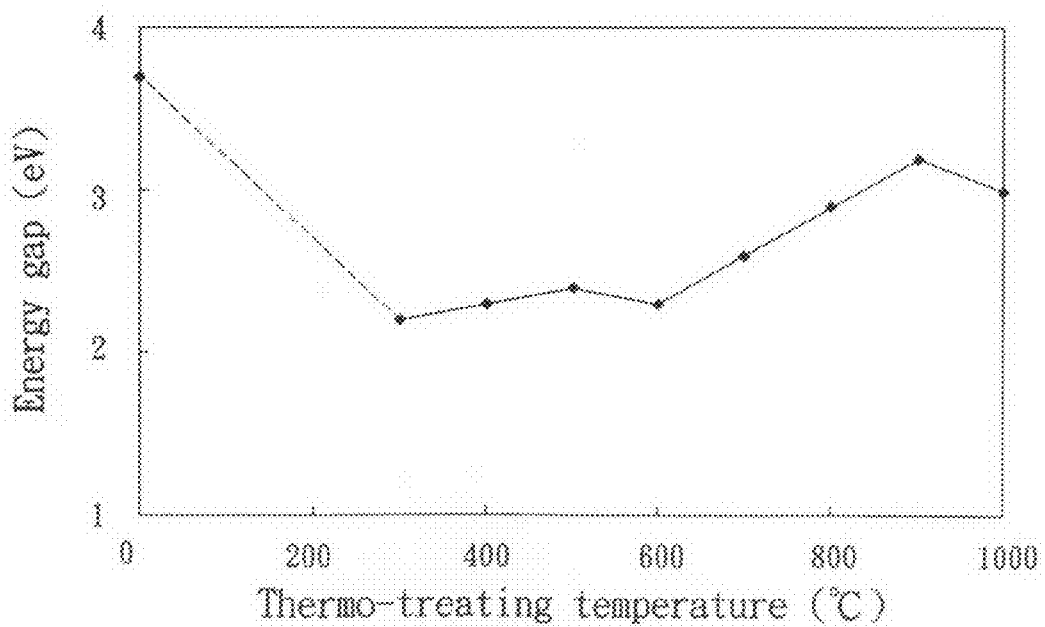
FIG. 11 is a plot illustrating the relationship between the energy gap and the thermo-treating temperature.

Referring to FIG. 11, the energy gap was detected using photoluminescence (PL) spectrum. The energy gap of $NH_4TiOF_3$ is 3.7 eV. The energy gaps at 300, 400, 500, 600, 700, and 800° C. are 2.2, 2.3, 2.4, 2.3, 2.6, and 2.9 eV, respectively. This means that the energy gap of the N—F-codoped $TiO_2$ crystallites is shifted to a level (i.e., below 3.1 eV) that makes $TiO_2$ capable of absorbing visible light to produce a photocatalytic activity.

Generally, the methods for detecting photocatalytic effect include: (1) comparison of the decoloration rate of methylene blue, (2) comparison of the life time of an electron/hole pair (EHP), and (3) detection of the concentration of residual copper ions using copper reduction method.

In the methylene blue method, a sample to be tested (1 cm×1 cm) was irradiated using an ultra-violet lamp for 1 hour to self-clean the sample. Three drops of methylene blue solution (100 ppm) were dripped on the sample. The sample was irradiated using a light emitting diode emitting blue light having a wavelength of 450 nm (i.e., 2.75 eV) to decompose and decolorize the methylene blue solution. The photocatalytic effect of the sample was measured by the decoloration rate of the methylene blue solution at the maximum absorption peak (664 nm). The faster the decoloration rate, the higher the photocatalytic effect will be.

Figure 12:
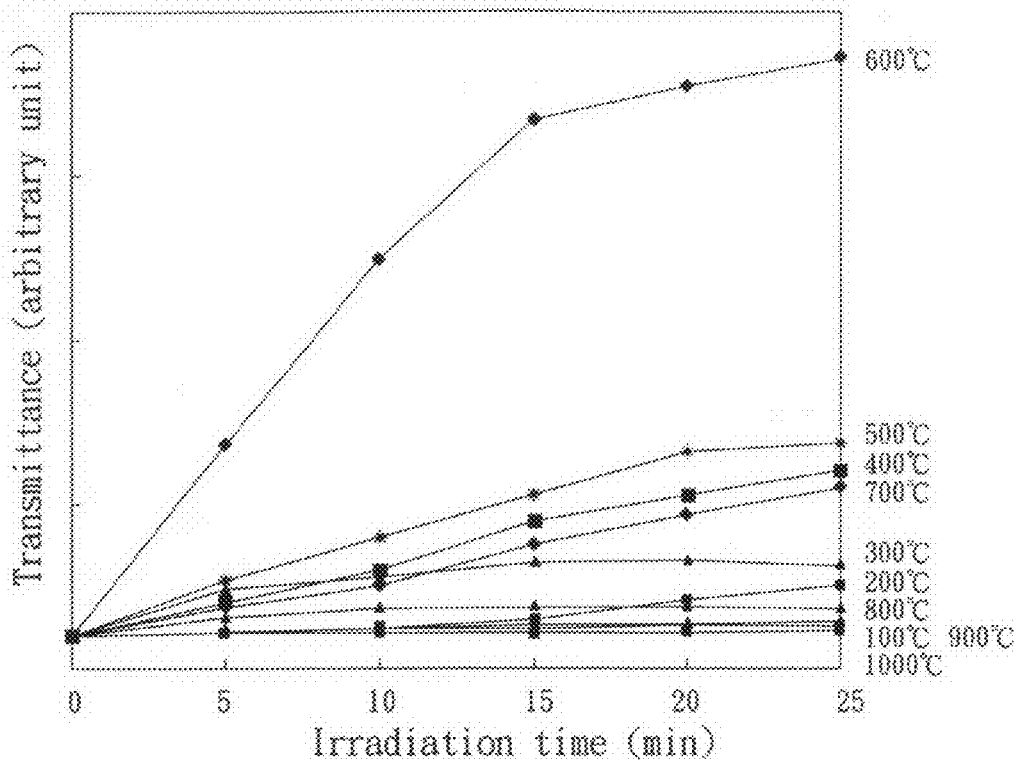
FIG. 12 is a plot illustrating the relationship between transmittance and the irradiation time.

Referring to FIG. 12, the $TiO_2$ crystallites formed at the thermo-treating temperature from 400 to 700° C. have a better photocatalytic effect, and the $TiO_2$ crystallites formed at the thermo-treating temperature of 600° C. have the best photocatalytic effect.

In the method of the life time of the electron/hole pair, it is confirmed in "*Journal of Physical Chemistry B,* 2003, Vol. 107, Iss 50, pp. 13871-13879" that the longer the life time, the higher the photocatalytic effect will be. A light emitting diode emitting blue light having a wavelength of 450 nm (i.e., 2.75 eV) was used as a light source in the method.

Figure 13:
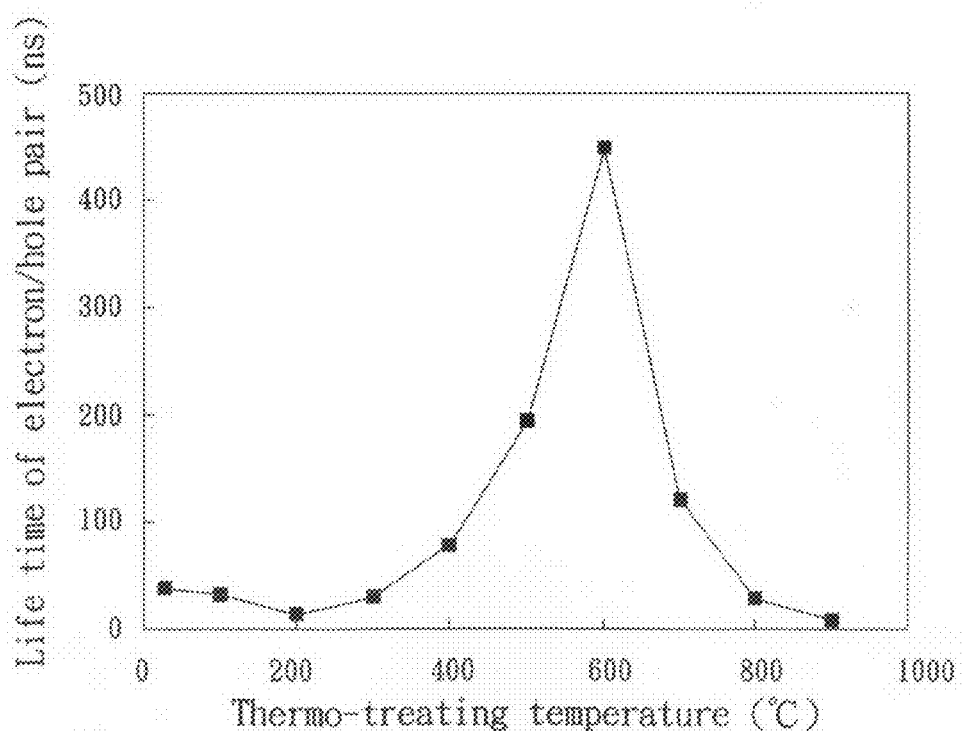
FIG. 13 is a plot illustrating the relationship between the life time of the electron/hole pair and the thermo-treating temperature.

Referring to FIG. 13, the $TiO_2$ crystallites formed at the thermo-treating temperature from 400 to 700° C. have a better life time, and the $TiO_2$ crystallites formed at the thermo-treating temperature of 600° C. have the best life time (449.2 nanosecond (ns)). This means that $TiO_2$ crystallites formed at the thermo-treating temperature of 600° C. have the best photocatalytic effect.

In the copper reduction method, a sample to be tested (1 cm×1 cm) was placed in a test tube containing 2 ml of a test solution, which was obtained by mixing 70 ppm of a copper ion solution with 0.1 M $Na_2C_2O_4$ solution in a 1:1 volume ratio and by adjusting the pH to 3.6 using sodium hydroxide solution or hydrochloride solution.

Figure 14:
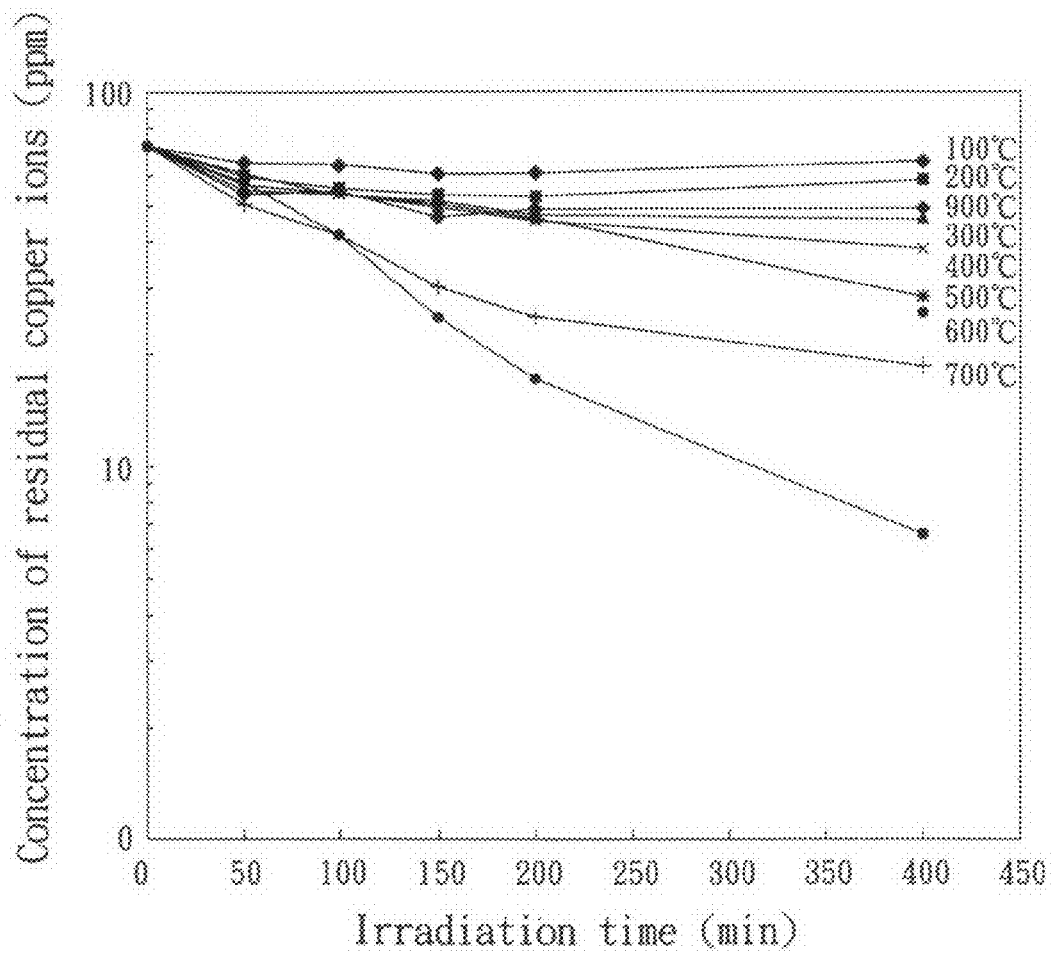
FIG. 14 is a plot illustrating the relationship between concentration of residual copper ions and irradiation time.

The test tube was filled with nitrogen and was sealed. A mercury lamp was used as a light source. The solution in the test tube was irradiated using the mercury lamp, and the copper ions were reduced to deposit on the surface of the test tube. The concentration of the residual copper ions in the solution can be measured to evaluate the photocatalytic effect. The lower the concentration of the residual copper ions, the higher the photocatalytic effect will be. The concentration of residual copper ions was detected using inductively coupled plasma spectroscopy (ICP-MS). As shown in FIG. 14, the relatively low concentration of the residual copper ions was obtained at the thermo-treating temperature ranging from 400 to 800° C., and the lowest concentration of the residual copper ions was obtained at the thermo-treating temperature of 800° C.

In view of the aforesaid, this invention has the following advantages:

1. The growth rate of $NH_4TiOF_3$ crystallites can be increased because hydrogen fluoride formed in reaction (1) is consumed through the reaction with a silicon-containing substrate. Thus, the molar ratio of the boric acid to ammonium fluorotitanate can be extended to a larger range from 0.2 to 1.5 compared to the prior art. Additionally, dangling bonds are formed on the surface of the silicon-containing substrate due to the reaction of hydrogen fluoride with the silicon-containing substrate. The bonding strength between the $NH_4TiOF_3$ crystallites and the silicon-containing substrate is relatively strong. Therefore, the amount of the $NH_4TiOF_3$ crystallites deposited on the silicon-containing substrate can be increased, which in turn raises the productivity of the N—F-codoped $TiO_2$ particles.

2. The N—F-codoped $TiO_2$ particles are formed by directly thermo-treating $NH_4TiOF_3$, which already contains N and F therein. Therefore, N and F can be distributed evenly in the N—F-codoped $TiO_2$ particles so as to improve the photocatalytic effect.

3. As shown in FIG. 5, the shell is collapsed and the nano-scale N—F-codoped $TiO_2$ particles are formed when the thermo-treating temperature is 600° C. Since the total surface area of the nano-scale N—F-codoped $TiO_2$ particles is increased due to the shell collapse, the photocatalytic effect of the N—F-codoped $TiO_2$ particles is improved.

4. The band gap of the N—F-codoped $TiO_2$ particles produced by the present invention is shifted to a level suitable for exciting the $TiO_2$ particles to produce photocatalysis using visible light, i.e., below 3.1 eV.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for preparing titanium dioxide particles co-doped with nitrogen and fluorine, comprising the steps of:
   mixing boric acid with ammonium fluorotitanate in an aqueous medium to form ammonium oxotrifluorotitanate;
   liquid-phase depositing the ammonium oxotrifluorotitanate on a silicon-containing substrate; and
   thermo-treating the ammonium oxotrifluorotitanate on the silicon-containing substrate at a temperature ranging from 400 to 800° C. to obtain the titanium dioxide particles co-doped with nitrogen and fluorine.

2. The method as claimed in claim 1, wherein a molar ratio of the boric acid to the ammonium fluorotitanate ranges from 0.2 to 1.5.

3. The method as claimed in claim 2, wherein the molar ratio is 0.6.

4. The method as claimed in claim 1, wherein the boric acid and the ammonium fluorotitanate are mixed at 40° C.

5. The method as claimed in claim 1, wherein the mixing step is conducted for 2 hours.

6. The method as claimed in claim 1, wherein the silicon-containing substrate is made of a material selected from the group consisting of polysilicon, silicon nitride, glass, and quartz.

7. The method as claimed in claim 6, wherein the silicon-containing substrate is made of glass.

8. The method as claimed in claim 1, wherein the ammonium oxotrifluorotitanate is thermo-treated at 600° C.

9. The method as claimed in claim 1, wherein the thermo-treating step is conducted under an atmosphere selected from the group consisting of oxygen, nitrogen, ozone, nitrous oxide, and inert gas.

10. A method for preparing titanium dioxide particles co-doped with nitrogen and fluorine, comprising the steps of:

mixing boric acid with ammonium fluorotitanate in an aqueous medium to form ammonium oxotrifluorotitanate;

liquid-phase depositing the ammonium oxotrifluorotitanate on a silicon-containing substrate; and thermo-treating the ammonium oxotrifluorotitanate on the silicon-containing substrate at a temperature ranging from 300 to 1000° C., wherein the thermo-treating step is conducted under oxygen.

11. The method as claimed in claim 1, wherein the thermo-treating step is conducted for a period ranging from 0.5 to 2 hours.

12. The method as claimed in claim 11, wherein the thermo-treating step is conducted for 1 hour.

* * * * *